US012812732B2

(12) United States Patent
Li et al.

(10) Patent No.: US 12,812,732 B2
(45) Date of Patent: Nov. 24, 2026

(54) COMMUNICATION METHOD AND APPARATUS

(71) Applicant: HUAWEI TECHNOLOGIES CO., LTD., Shenzhen (CN)

(72) Inventors: Meng Li, Beijing (CN); Cuili Ge, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 280 days.

(21) Appl. No.: 18/621,110

(22) Filed: Mar. 29, 2024

(65) Prior Publication Data

US 2024/0244711 A1 Jul. 18, 2024

Related U.S. Application Data

(63) Continuation of application No. PCT/CN2022/120102, filed on Sep. 21, 2022.

(30) Foreign Application Priority Data

Oct. 11, 2021 (CN) .......................... 202111183542.3

(51) Int. Cl.
*H04W 76/40* (2018.01)
*H04W 72/0453* (2023.01)
*H04W 76/20* (2018.01)

(52) U.S. Cl.
CPC ....... *H04W 76/40* (2018.02); *H04W 72/0453* (2013.01); *H04W 76/20* (2018.02)

(58) Field of Classification Search
CPC . H04W 76/40; H04W 72/0453; H04W 76/11; H04W 76/20; H04W 4/02; H04W 4/06; H04W 4/08
See application file for complete search history.

(56) References Cited

U.S. PATENT DOCUMENTS

2020/0260233 A1* 8/2020 Yang .................... H04W 76/11
2021/0281981 A1 9/2021 Li et al.

FOREIGN PATENT DOCUMENTS

CN 109699013 A 4/2019
WO WO-2021127946 A1 * 7/2021 ............. H04W 4/06

OTHER PUBLICATIONS

3GPP TSG-RAN WG2 Meeting#96 R2-167812, Cell Reselection Aspects Related to Multi-cast in NB-IoT, Huawei, HiSilicon, Neul Ltd. Reno, Nevada, USA, Nov. 14-18, 2016, total 2 pages.

(Continued)

*Primary Examiner* — Khoa Huynh

(57) ABSTRACT

This disclosure provides a communication method and apparatus. The method includes: A multicast session management network element receives first information of a first multicast service from an application server, where the first information indicates at least one of the following: a first service area of the first multicast service, a type of the first multicast service, or the first multicast service. The multicast session management network element sends a service area identifier of the first multicast service to the application server based on the first information. In this way, the application server may obtain the service area identifier of the first multicast service, namely, a service area identifier (SAI) of the first multicast service when the application server does not learn of network topology information.

20 Claims, 3 Drawing Sheets

(56) References Cited

OTHER PUBLICATIONS

3GPP TSG-SA WG6 Meeting#45-bis S6-212265, Pseudo-CR on update solution 10 related to MBS session configuration and service announcement, Ericsson, e-meeting, Oct. 11-19, 2021, total 5 pages.
3GPP TS 23.247 V17.0.0 (Sep. 2021), 3rd Generation Partnership Project; Technical Specification Group Services and System Aspects; Architectural enhancements for 5G multicast-broadcast services; Stage 2 (Release 17), total 94 pages.
3GPP TS 23.503 V17.2.0 3rd Generation Partnership Project; Technical Specification Group Services and System Aspects; Policy and charging control framework for the 5G System (5GS); Stage 2 (Release 17), Sep. 2021, total 138 pages.
3GPP TS 23.501 V17.2.0 3rd Generation Partnership Project; Technical Specification Group Services and System Aspects; System architecture for the 5G System (5GS); Stage 2 (Release 17), Sep. 2021, total 534 pages.
3GPP TS 23.502 V17.2.1 3rd Generation Partnership Project; Technical Specification Group Services and System Aspects; Procedures for the 5G System (5GS); Stage 2 (Release 17), total 705 pages.

* cited by examiner

200

COMMUNICATION METHOD AND APPARATUS

CROSS-REFERENCE TO RELATED APPLICATIONS

This application is a continuation of an International Application No. PCT/CN2022/120102, filed on Sep. 21, 2022, which claims priority to Chinese Patent application Ser. No. 202111183542.3, filed on Oct. 11, 2021. The disclosures of the aforementioned applications are hereby incorporated by reference in their entireties.

TECHNICAL FIELD

Embodiments of this application relate to the communication field, and more specifically, to a communication method and apparatus.

BACKGROUND

In wireless communication, before a broadcast service is started, a base station broadcasts, through an air interface via a system information block (SIB), a correspondence that is between a multicast/broadcast service and a frequency and that may be subsequently sent in a cell. In this way, a terminal device selects a frequency of the multicast and broadcast sevice to receive broadcast data. In this case, the multicast/broadcast service sent via the SIB may be a multicast/broadcast service that has been allocated with a resource in a core network, or may be a multicast/broadcast service that is allocated with only a multicast/broadcast service identifier, for example, a temporary mobile group identity (TMGI).

In multicast and broadcast of a 4th generation (4G) system, a service area identifier (SAI) is defined. The base station broadcasts a correspondence between the SAI and the frequency via the SIB, and a correspondence between the TMGI and the SAI is configured on a terminal device side. In this way, the terminal device may obtain a correspondence between the TMGI and the frequency by reading a SIB message. In addition, an application scenario of the multicast and broadcast of the 4G system is mainly a public safety scenario. Therefore, it may be assumed that an application server (AS) has high permission, and the AS may learn of network topology information. In other words, the AS may learn of the correspondence between the TMGI and the SAI.

Currently, in multicast and broadcast of a 5th generation (5G) system, only a TMGI is defined. If no optimization is performed on a network side, excessive TMGIs are sent in a SIB message, and waste of system broadcast resources is caused consequently. In addition, for the multicast and broadcast of the 5G system, even if an SAI is defined, because an application scenario of the multicast and broadcast of the 5G system is wide, it cannot be assumed that an AS has high permission, and the AS cannot learn of network topology information. In other words, the AS cannot learn of the correspondence between the TMGI and the SAI. Therefore, for the multicast and broadcast of the 5G system, how to obtain, when the AS does not learn of the network topology information, a SAI corresponding to a multicast/broadcast service is an urgent problem to be resolved.

SUMMARY

Embodiments of this application provide a communication method and apparatus, so that a service area identifier (SAI) corresponding to a multicast/broadcast service can be obtained when an AS does not learn of network topology information. This helps reduce waste of system broadcast resources.

According to a first aspect, a communication method is provided. The communication method may be performed by, for example, a multicast session management network element, or may be performed by a component (such as a circuit, a chip, or a chip system) configured in the multicast session management network element. This is not limited in this application.

The communication method includes: receiving first information of a first multicast service from an application server, where the first information indicates at least one of the following: a first service area of the first multicast service, a type of the first multicast service, or the first multicast service; and sending a second service area identifier of the first multicast service to the application server based on the first information.

In the foregoing technical solution, the multicast session management network element sends the second service area identifier of the first multicast service to the application server based on the first information sent by the application server. In this way, the application server may obtain the second service area identifier of the first multicast service, namely, a SAI of the first multicast service, when the application server does not learn of network topology information.

With reference to the first aspect, in some implementations of the first aspect, that the multicast session management network element sends a second service area identifier of the first multicast service to the application server based on the first information includes: The multicast session management network element determines the second service area identifier of the first multicast service corresponding to the first information. The multicast session management network element sends the second service area identifier of the first multicast service to the application server.

With reference to the first aspect, in some implementations of the first aspect, the communication method further includes: The multicast session management network element sends second information of the first multicast service to the application server, where the second information includes at least one of the following: a frequency of the first multicast service or a temporary multicast group identifier of the first multicast service.

When the second information includes the temporary multicast group identifier of the first multicast service, a scenario in which the application server requests a plurality of temporary mobile group identities may be supported.

When the second information includes the frequency of the first multicast service, a frequency corresponding to the second service area identifier of the first multicast service on a network side may be further obtained. In this way, the frequency corresponding to the second service area identifier of the first multicast service may be further provided for a terminal device, so that the terminal device can directly obtain a corresponding parameter, for example, scheduling information, of multicast based on the frequency corresponding to the second service area identifier of the first multicast service. A step in which the terminal device first reads, from a network device, the frequency corresponding to the second service area identifier of the first multicast service is saved, in other words, power consumption and signaling overheads of the terminal device are reduced.

In an implementation, that the multicast session management network element sends second information of the first multicast service to the application server includes: The multicast session management network element determines the second information that is of the first multicast service and that corresponds to the first information of the first multicast service. The multicast session management network element sends the second information of the first multicast service to the application server.

In another implementation, that the multicast session management network element sends second information of the first multicast service to the application server includes: The multicast session management network element determines the second information that is of the first multicast service and that corresponds to the second service area identifier of the first multicast service. The multicast session management network element sends the second information of the first multicast service to the application server.

With reference to the first aspect, in some implementations of the first aspect, the first information is carried in a temporary multicast group identifier allocation request message.

The first information is carried in an existing temporary multicast group identifier allocation request message. To be specific, in a process in which the application server requests allocation of the temporary multicast group identifier, allocation of the second service area identifier of the first multicast service is requested. In this way, an existing procedure of requesting allocation of the temporary multicast group identifier may be reused, a change to an existing protocol is reduced, a processing speed is accelerated, and interaction between network elements does not need to be performed again.

With reference to the first aspect, in some implementations of the first aspect, the second service area identifier of the first multicast service is carried in a response message of the temporary multicast group identifier allocation request message.

The second service area identifier of the first multicast service is carried in a response message of the existing temporary multicast group identifier allocation request message. To be specific, in a process in which the multicast session management network element requests allocation of the temporary multicast group identifier, the second service area identifier of the first multicast service is carried in the response message of the temporary multicast group identifier allocation request message and sent to the application server. In this way, an existing procedure of requesting allocation of the temporary multicast group identifier may be reused, a change to an existing protocol is reduced, a processing speed is accelerated, and interaction between network elements does not need to be performed again.

With reference to the first aspect, in some implementations of the first aspect, the second information of the first multicast service is carried in the response message of the temporary multicast group identifier allocation request message.

The second information of the first multicast service is carried in the response message of the existing temporary multicast group identifier allocation request message. To be specific, in a process in which the multicast session management network element requests allocation of the temporary multicast group identifier, the second information of the first multicast service is carried in the response message of the temporary multicast group identifier allocation request message and sent to the application server. In this way, an existing procedure of requesting allocation of the temporary multicast group identifier may be reused, a change to an existing protocol is reduced, a processing speed is accelerated, and interaction between network elements does not need to be performed again.

With reference to the first aspect, in some implementations of the first aspect, the communication method further includes: The multicast session management network element receives a session creation request message from the application server. The multicast session management network element notifies a first network device of the second service area identifier of the first multicast service based on the session creation request message.

Optionally, the session creation request message may carry the second service area identifier of the first multicast service and/or the second information of the first multicast service. In this way, when the multicast session management network element does not store the second service area identifier of the first multicast service and/or the second information of the first multicast service, the multicast session management network element may obtain the second service area identifier of the first multicast service and/or the second information of the first multicast service. In this way, the second service area identifier of the first multicast service and/or the second information of the first multicast service are/is provided for a corresponding network device, and the corresponding network device, namely, a first network device, may be dynamically controlled to broadcast the second service area identifier of the first multicast service. In addition, the first network device does not broadcast excessive TMGIs, so that waste of system broadcast resources is avoided.

With reference to the first aspect, in some implementations of the first aspect, that the multicast session management network element notifies a first network device of the second service area identifier of the first multicast service based on the session creation request message includes: The multicast session management network element determines the first network device based on the session creation request message. The multicast session management network element notifies the first network device of the second service area identifier of the first multicast service.

With reference to the first aspect, in some implementations of the first aspect, the communication method further includes: The multicast session management network element notifies the first network device of the second information of the first multicast service.

According to a second aspect, a communication method is provided. The communication method may be performed by, for example, an application server, or may be performed by a component (such as a circuit, a chip, or a chip system) configured in the application server. This is not limited in this application.

The communication method includes: sending first information of a first multicast service to a multicast session management network element, where the first information includes at least one of the following: a first service area of the first multicast service, a type of the first multicast service, or the first multicast service; receiving a second service area identifier of the first multicast service from the multicast session management network element; and notifying a terminal device of the second service area identifier of the first multicast service.

In the foregoing technical solution, the application server sends the first information to the multicast session management network element, and requests the second service area identifier of the first multicast service, to obtain the second service area identifier of the first multicast service from the multicast session management network element. In this way, the application server may obtain the second service area identifier of the first multicast service, namely, a SAI of the first multicast service, when the application server does not learn of network topology information.

With reference to the second aspect, in some implementations of the second aspect, the communication method further includes: The application server receives second information of the first multicast service from the multicast session management network element, where the second information includes at least one of the following: a frequency of the first multicast service or a temporary multicast group identifier of the first multicast service.

With reference to the second aspect, in some implementations of the second aspect, the first information is carried in a temporary multicast group identifier allocation request message.

With reference to the second aspect, in some implementations of the second aspect, the second service area identifier of the first multicast service is carried in a response message of the temporary multicast group identifier allocation request message.

With reference to the second aspect, in some implementations of the second aspect, that the application server notifies a terminal device of the second service area identifier of the first multicast service includes: The application server notifies the terminal device of the second service area identifier that is of the first multicast service and that is carried in a service announcement message.

The second service area identifier of the first multicast service is carried in an existing service announcement message. In this way, an existing procedure of requesting allocation of the temporary multicast group identifier may be reused, a change to an existing protocol is reduced, a processing speed is accelerated, and interaction between network elements does not need to be performed again.

With reference to the second aspect, in some implementations of the second aspect, the communication method further includes: The application server notifies the terminal device of the second information of the first multicast service.

With reference to the second aspect, in some implementations of the second aspect, that the application server notifies a terminal device of the second information of the first multicast service includes: The application server notifies the terminal device of the second information that is of the first multicast service and that is carried in the service announcement message.

The second information of the first multicast service is carried in the existing service announcement message. In this way, an existing procedure of requesting allocation of the temporary multicast group identifier may be reused, a change to an existing protocol is reduced, a processing speed is accelerated, and interaction between network elements does not need to be performed again.

According to a third aspect, a communication method is provided. The communication method may be performed by, for example, a network element of a network device, or may be performed by a component (such as a circuit, a chip, or a chip system) configured in the network device. This is not limited in this application.

The communication method includes: receiving a second service area identifier of a first multicast service; and broadcasting the second service area identifier of the first multicast service.

The network device may dynamically broadcast the second service area identifier of the first multicast service based on the received second service area identifier of the first multicast service. In this way, the network device does not broadcast excessive TMGIs, so that waste of system broadcast resources is avoided.

With reference to the third aspect, in some implementations of the third aspect, the communication method further includes: The network device receives second information of the first multicast service and/or a first service area of the first multicast service. The network device broadcasts the second information of the first multicast service and/or the first service area of the first multicast service, where the second information includes at least one of the following: a frequency of the first multicast service or a temporary multicast group identifier of the first multicast service.

According to a fourth aspect, a communication apparatus is provided. The apparatus is configured to perform the communication method in any possible implementation of the first aspect. Specifically, the apparatus may include a unit and/or a module, for example, a processing unit and/or a communication unit, configured to perform the communication method provided in the first aspect or any implementation of the first aspect.

In an implementation, the apparatus is a multicast session management network element. When the apparatus is the multicast session management network element, the communication unit may be a transceiver or an input/output interface. The processing unit may be at least one processor. Optionally, the transceiver may be a transceiver circuit. Optionally, the input/output interface may be an input/output circuit.

In another implementation, the apparatus is a chip, a chip system, or a circuit configured in a multicast session management network element. When the apparatus is the chip, the chip system, or the circuit configured in the multicast session management network element, the communication unit may be an input/output interface, an interface circuit, an output circuit, an input circuit, a pin, a related circuit, or the like on the chip, the chip system, or the circuit. The processing unit may be at least one processor, a processing circuit, a logic circuit, or the like.

According to a fifth aspect, a communication apparatus is provided. The apparatus is configured to perform the communication method in any possible implementation of the second aspect. Specifically, the apparatus may include a unit and/or a module, for example, a processing unit and/or a communication unit, configured to perform the communication method provided in the second aspect or any implementation of the second aspect.

In an implementation, the apparatus is an application server. When the apparatus is the application server, the communication unit may be a transceiver or an input/output interface. The processing unit may be at least one processor. Optionally, the transceiver may be a transceiver circuit. Optionally, the input/output interface may be an input/output circuit.

In another implementation, the apparatus is a chip, a chip system, or a circuit configured in an application server. When the apparatus is the chip, the chip system, or the circuit configured in the application server, the communication unit may be an input/output interface, an interface circuit, an output circuit, an input circuit, a pin, a related circuit, or the like on the chip, the chip system, or the circuit. The processing unit may be at least one processor, a processing circuit, a logic circuit, or the like.

According to a sixth aspect, a communication apparatus is provided. The apparatus is configured to perform the communication method in any possible implementation of the third aspect. Specifically, the apparatus may include a unit and/or a module configured to perform the communication method, for example, a processing unit and/or a communication unit, provided in the third aspect or any implementation of the third aspect.

In an implementation, the apparatus is a network device. When the apparatus is the network device, the communication unit may be a transceiver or an input/output interface. The processing unit may be at least one processor. Optionally, the transceiver may be a transceiver circuit. Optionally, the input/output interface may be an input/output circuit.

In another implementation, the apparatus is a chip, a chip system, or a circuit configured in a network device. When the apparatus is the chip, the chip system, or the circuit configured in the network device, the communication unit may be an input/output interface, an interface circuit, an output circuit, an input circuit, a pin, a related circuit, or the like on the chip, the chip system, or the circuit. The processing unit may be at least one processor, a processing circuit, a logic circuit, or the like.

According to a seventh aspect, a communication apparatus is provided. The apparatus includes: a memory, configured to store a program; and at least one processor, configured to execute a computer program or instructions stored in the memory, to perform the communication method in the first aspect or any implementation of the first aspect.

In an implementation, the apparatus is a multicast session management network element.

In another implementation, the apparatus is a chip, a chip system, or a circuit configured in a multicast session management network element.

According to an eighth aspect, a communication apparatus is provided. The apparatus includes: a memory, configured to store a program; and at least one processor, configured to execute a computer program or instructions stored in the memory, to perform the communication method in the second aspect or any implementation of the second aspect.

In an implementation, the apparatus is an application server.

In another implementation, the apparatus is a chip, a chip system, or a circuit configured in an application server.

According to a ninth aspect, a communication apparatus is provided. The apparatus includes: a memory, configured to store a program; and at least one processor, configured to execute a computer program or instructions stored in the memory, to perform the communication method in the third aspect or any implementation of the third aspect.

In an implementation, the apparatus is a network device.

In another implementation, the apparatus is a chip, a chip system, or a circuit configured in a network device.

According to a tenth aspect, a processor is provided. The processor is configured to perform the communication method according to any possible implementation of the first aspect to the third aspect.

Operations such as sending and obtaining/receiving related to the processor may be understood as operations such as outputting and receiving or inputting performed by the processor unless otherwise specified or if the operations does not conflict with an actual function or internal logic of the operations in a related description, or may be understood as operations of sending and receiving performed by a radio frequency circuit and an antenna. This is not limited in this application.

According to an eleventh aspect, a computer program product is provided. The computer program product includes a computer program (which may also be referred to as code or instructions). When the computer program is run, a computer is enabled to perform the communication method according to any possible implementation of the first aspect to the third aspect.

According to a twelfth aspect, a computer-readable storage medium is provided. The computer-readable storage medium stores a computer program (which may also be referred to as code or instructions). When the computer program is run on a computer, the computer is enabled to perform the communication method according to any possible implementation of the first aspect to the third aspect.

According to a thirteenth aspect, a chip is provided and includes a processor and a communication interface. The processor reads, through the communication interface, instructions stored in a memory, to perform the communication method according to any possible implementation of the first aspect to the third aspect.

Optionally, in an implementation, the chip further includes the memory. The memory stores a computer program or instructions, and the processor is configured to execute the computer program or the instructions stored in the memory. When the computer program or the instructions are executed, the processor is configured to perform the communication method according to any possible implementation of the first aspect to the third aspect.

According to a fourteenth aspect, a communication system is provided and includes the multicast session management network element, the application server, and/or the first network device described above. The multicast session management network element is configured to perform the communication method according to any possible implementation of the first aspect; the application server is configured to perform the communication method according to any possible implementation of the second aspect; or the first network device is configured to perform the communication method according to any possible implementation of the third aspect.

DESCRIPTION OF EMBODIMENTS

The following describes technical solutions of embodiments in this application with reference to accompanying drawings.

The technical solutions of embodiments of this application may be applied to various communication systems, such as a global system for mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5G system, or a new radio (NR) system.

The technical solutions provided in this application may be further applied to a future communication system, for example, a sixth generation mobile communication system. This is not limited in this application.

The technical solutions provided in this application may be further applied to machine type communication (MTC), long term evolution-machine (LTE-M), a device to device (D2D) network, a machine to machine (M2M) network, an internet of things (IoT) network, or another network. The IoT network may include, for example, internet of vehicles. Communication manners in an internet of vehicles system are collectively referred to as vehicle to X (vehicle to X, V2X, where X may represent anything). For example, the V2X may include: vehicle to vehicle (V2V) communication, vehicle to infrastructure (V2I) communication, vehicle to pedestrian (V2P) communication, or vehicle to network (V2N) communication.

Figure 1:
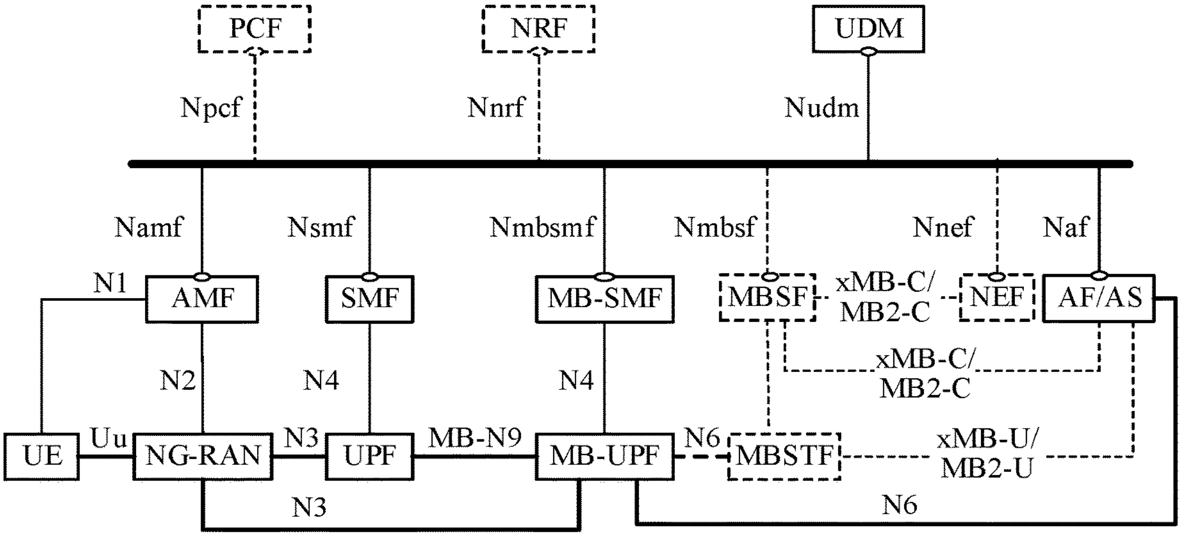
FIG. 1 is a diagram of an architecture of a communication system.

FIG. 1 is a schematic diagram of an architecture of a communication system applicable to an embodiment of this application. As shown in FIG. 1, the architecture is, for example, a 5G system (5GS) defined in the 3rd generation partnership project (3GPP) protocol TS23.501. The architecture may be divided into two parts: an access network (AN) and a core network (CN). The access network may be configured to implement a function related to radio access. The core network mainly includes the following several key logical network elements: an access and mobility management function (AMF), a session management function (SMF), a user plane function (UPF), a policy control function (PCF), a unified data management (UDM), and the like.

The following briefly describes network elements shown in FIG. 1.

1. User equipment (UE): The user equipment may be referred to as a terminal device, an access terminal, a subscriber unit, a subscriber station, a mobile station, a remote station, a remote terminal, a mobile device, a user terminal, a terminal, a wireless communication device, a user agent, or a user apparatus.

The terminal device may be a device that provides voice/data connectivity for a user, for example, a handheld device or a vehicle-mounted device having a wireless connection function. Currently, examples of some terminals are as follows: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, or a terminal device in a future evolved public land mobile network (PLMN). This is not limited in embodiments of this application.

By way of example but not limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that is directly worn on the body or integrated into clothes or an accessory of a user. The wearable device is not only a hardware device, but also implements a powerful function through software support, data exchange, and cloud interaction. In a broad sense, the wearable intelligent device includes a full-function and large-size device that can implement complete or partial functions without depending on a smartphone, for example, a smart watch or smart glasses, and a device that focuses on only a specific type of application function and needs to be used with another device such as a smartphone, for example, various smart bands and smart jewelry that perform physical sign monitoring.

In addition, in embodiments of this application, the terminal device may alternatively be a terminal device in an internet of things (IoT) system. An IoT is an important part of the development of future information technologies. A main technical feature of the IoT is to connect a thing to a network via a communication technology, to implement an intelligent network for interconnection between a person and a machine or between things.

2. Access network: The access network provides a network access function for user equipment, and can use transmission tunnels of different quality based on a user level, a requirement for a service, and the like. The access network may be an access network using different access technologies. Currently, there are two types of radio access technologies: a 3GPP access technology (for example, a radio access technology used in a 3G, 4G, or 5G system) and a non-3GPP access technology. The 3GPP access technology is an access technology that complies with a 3GPP standard specification. For example, an access network device in the 5G system is referred to as a next generation node base station (gNB). The non-3GPP access technology is an access technology that does not comply with the 3GPP standard specification, for example, an air interface technology represented by an access point (AP) in wireless fidelity (Wi-Fi).

An access network that implements a network access function based on a wireless communication technology may be referred to as a radio access network (RAN). In a 5G communication system, the RAN may also be referred to as a next generation radio access network (NG-RAN). The radio access network can manage radio resources, provide an access service for a terminal device, and further complete forwarding of a control signal and user data between the terminal and a core network.

The radio access network may include but is not limited to: a radio network controller (RNC), a NodeB (NB), a base station controller (BSC), a base transceiver station (base transceiver station, BTS), a home base station (for example, a home evolved NodeB or a home NodeB, HNB), a baseband unit (BBU), an AP, a radio relay node, a radio backhaul node, a transmission point (TP), a transmission reception point (TRP), or the like in a Wi-Fi system, or may be a gNB or a transmission point (TRP or TP) in the 5G (for example, NR) system or one antenna panel or one group of antenna panels (including a plurality of antenna panels) of a base station in the 5G system, or may be a network node constituting a gNB or a transmission point, for example, a baseband unit (BBU), a distributed unit (DU), or a base station in a next generation communication 6G system. A specific technology and a specific device form used by a radio access network device are not limited in embodiments of this application.

The access network may provide a service for a cell. The terminal device may communicate with the cell through a transmission resource (for example, a frequency domain resource or a spectrum resource) allocated by the access network device.

In addition, in embodiments of this application, the access network device may be further configured to: receive MBS data through a shared N3 interface, and transmit the MBS data to the terminal device in a transmission manner of point to point (PTP) or point to multipoint (PTM); or manage a QoS flow of an MBS session through an N2 interface.

3. AMF: The AMF is mainly used for mobility management and access management, such as user location update, user network registration, and user switching. The AMF may be further configured to implement a function other than session management in a mobility management entity (MME), for example, a function of lawful interception or access authorization (or authentication).

In embodiments of this application, the AMF may further perform the following functions: performing signaling exchange with the access network device and a multicast/broadcast session management function (multicast/broadcast SMF, MB-SMF) for MBS session management; selecting the access network device for broadcasting; and the like.

4. SMF: The SMF is mainly used for the session management, internet protocol (IP) address assignment and management of the UE, manageable user plane function selection, policy control or charging function interface termination, downlink data notification, and the like.

5. MB-SMF: The MB-SMF is a session management function network element having an MBS function. The MB-SMF may be used for MBS session management (including QoS control) and MBS transmission control, including configuring a data plane gateway MB-UPF and a RAN node (via an AMF) for MBS flow transmission according to a policy rule of an MBS from a PCF or a local MBS. The MB-SMF may alternatively be connected to a server of the MBS, a multicast/broadcast service function (MBSF) network element, or a network exposure function (NEF), to receive information (for example, target information) related to the MBS. In addition, the MB-SMF may alternatively be connected to the PCF, to create a resource for the MBS. The MB-SMF may be integrated into the PCF or an SMF as a functional module, or may be independently deployed. This is not limited in this application.

In embodiments of this application, the MB-SMF may further perform the following function: selecting the AMF.

6. UPF: The UPF is a data plane gateway. The UPF may be used for packet routing and forwarding, quality of service (QoS) processing of user plane data, and the like. User data may be accessed to a data network (DN) through such a network element.

7. Multicast/broadcast user plane function (multicast/broadcast UPF, MB-UPF): The multicast/broadcast data plane gateway is configured to transmit a QoS flow of an MBS to a RAN. The MB-UPF supports the following functions of the MBS: filtering a downlink packet of an MBS flow; distributing an MBS packet to a RAN node (or a UPF); and QoS enhancing and counting/reporting according to an existing method. The MB-UPF may be integrated into the UPF as a functional module, or may be independently deployed. This is not limited in this application.

8. Multicast/broadcast service function (MBSF): The multicast/broadcast service function includes a related management function at a multicast/broadcast service layer. A function that is supported by the MBSF and that is related to an MBS includes: exchanging related information at a service layer with an NEF, an MB-SMF, and a multicast/broadcast service transport function (MBSTF); performing a coding-related management function on downlink multicast/broadcast service data; filtering and modifying a parameter provided by an application function (AF) for a control plane; and determining a data transmission manner (for example, unicast transmission or broadcast transmission).

9. MBSTF: The MBSTF includes a related data transmission function at a multicast/broadcast service layer. A function that is supported by the MBSTF and that is related to an MBS includes: interacting with an MBSF to obtain control information of multicast/broadcast data transmission; performing encoding on downlink multicast/broadcast service data based on a configuration of the MBSF; distributing multicast and broadcast data received from an AF, and transmitting the multicast and broadcast data to an MB-SMF or a UPF; and the like.

10. NEF: The NEF is configured to securely expose, to the outside, a service, a capability, and the like that are provided by a 3GPP network function.

11. AF: The AF is responsible for providing a service for a 3GPP network, for example, affecting service routing or interacting with a PCF to perform policy control.

In embodiments of this application, the AF may also be referred to as an AS.

12. Policy control function (PCF): The policy control function is configured to: guide a unified policy framework of a network behavior, provide policy rule information for a control plane function network element (for example, an AMF or an SMF), and the like.

13. Network repository function (network function (NF) repository function, NRF): The network repository function is configured to: store description information of a network functional entity and description information of a service provided by the network functional entity, and support a service discovery, a network element entity discovery, and the like.

14. Unified data management (UDM): The unified data management is used for storing user data, such as subscription information and authentication/authorization information.

In the architecture shown in FIG. 1, the network elements may communicate with each other through an interface shown in the figure. As shown in FIG. 1, an N1 interface is a reference point between the terminal device and the AMF. An N2 interface is a reference point between the NG-RAN and the AMF, and is used for sending a non-access stratum (NAS) message and the like. An N3 interface is a reference point between the NG-RAN and the UPF, and is used for transmission of user plane data and the like. The N3 interface is further a reference point between the NG-RAN and the MB-UPF, and is used for transmission of the user plane data and the like. An N4 interface is a reference point between the SMF and the UPF, and is used for transmission of information such as tunnel identification information of an N3 connection, data buffer indication information, and a downlink data notification message. An N6 interface is a reference point between the MB-UPF and the DN, and is used for transmission of the user plane data and the like.

In addition, an N11mb interface (which is not shown in FIG. 1) is a reference point between the AMF and the MB-SMF, and is used for an exchange of a session parameter related to multicast and broadcast between the AMF and the MB-SMF, for example, information about updating a QoS and an area, and indication information of activating/deactivating a multicast session. After receiving a parameter of the MB-SMF, the AMF may transmit the parameter to a corresponding base station side. An N33 interface is a reference point between the AF/AS and the NEF, and is used by the AF/AS to provide the NEF with a parameter related to the multicast and broadcast, for example, a service area and a multicast/broadcast service requirement. An Nmb10 interface (which is not shown in FIG. 1) is a reference point between the AF/AS and the MBSF, and is used by the AF/AS to provide the MBSF with the parameter related to the multicast and broadcast, for example, the service area, the multicast/broadcast service requirement, and coding information. An Nmb13 interface (which is not shown in FIG. 1) is a reference point between the AF/AS and the MB-SMF, and is used by the AF/AS to provide the MB-SMF with the parameter related to the multicast and broadcast, for example, the service area and the multicast/broadcast service requirement. An N29mb interface (which is not shown in FIG. 1) is a reference point between the NEF and the MB-SMF, and is used by the NEF to provide the MB-SMF with a parameter sent by an AF side. Optionally, the NEF may properly process the parameter of the AF (for example, translate geographic location information into a cell identifier or a tracking area identifier) and send a processed parameter to the MB-SMF. An Nmb1 interface (which is not shown in FIG. 1) is a reference point between the MBSF and the MB-SMF, and is used for an exchange of service information between the MBSF and the MB-SMF, for example, an indication of a start/an end of multicast/broadcast session transmission.

A relationship between another interface and network elements is shown in FIG. 1. For brevity, details are not described herein one by one.

Npcf, Nnrf, Nudm, Namf, Nsmf, Nmbsmf, Nnef, Naf, xmb-C/MB2-C, xmb-U/MB2-U, N1, N2, N3, N4, N6, MB-N9, and Uu in FIG. 1, and N11mb, Nmb10, Nmb13, N29mb and Nmb1 that are not shown in FIG. 1 are interface serial numbers. For meanings of the interfaceserial numbers, refer to meanings defined in the 3rd generation partnership project (3GPP) standard agreement. This is not limited herein.

It should be noted that names of the network elements and the communication interfaces between the network elements in FIG. 1 are briefly described by using an example specified in a current protocol. However, this does not mean that embodiments of this application can be applied only to a currently known communication system. Therefore, a standard name that appears when a current protocol is used as an example for description is a functional description. A specific name of a network element, an interface, signaling, or the like is not limited in this application, and only indicates a function of the network element, the interface, or the signaling, and may be correspondingly extended to another system, such as a 2G, 3G, 4G, or future communication system.

An architecture to which embodiments of this application shown in FIG. 1 are applicable is merely an example for description. The architecture to which embodiments of this application are applicable is not limited thereto. Any architecture that can implement functions of the foregoing network elements is applicable to embodiments of this application.

It should be further understood that the AMF, the SMF, the UPF, the MB-UPF, the MB-SMF, the MBSF, the MBSTF, the NEF, the PCF, the NRF, and the UDM that are shown in FIG. 1 may be understood as network elements that are configured to implement different functions and that are in the core network, for example, may be combined into a network slice as needed. The core network elements may be independent devices, or may be integrated into a same device to implement different functions. A specific form of the foregoing network elements is not limited in this application.

It should be further understood that the foregoing names are defined merely for ease of distinguishing between different functions, and should not constitute any limitation on this application. This application does not exclude a possibility that another name is used in the 5G network and another future network. For example, in a 6G network, a part or all of the foregoing network elements may still use terms in 5G, or may use another name or the like. Names of interfaces between the network elements in FIG. 1 are merely examples. In a specific implementation, the name of the interface may be another name. This is not specifically limited in this application. In addition, a name of a message (or signaling) transmitted between the foregoing network elements is merely an example, and constitutes no limitation on a function of the message.

For ease of understanding of embodiments of this application, terms involved in this application are first briefly described.

1. Multicast: A same service and same specific content data are simultaneously provided for a group of dedicated UE (in other words, not all UE in multicast coverage is authorized to receive data).

2. Broadcast: Same specific content data is provided for all UE in a geographic area (in other words, all UE in a broadcast coverage area is authorized to receive data). Multicast may also be referred to as groupcast.

3. Multicast/broadcast session (MBS session): One multicast/broadcast session may provide a service for one multicast/broadcast service. The multicast/broadcast session includes a unicast or groupcast tunnel from a data network to a core network device and then to an access network device, and a unicast or multicast/broadcast air interface resource allocated by the access network device for sending the multicast/broadcast service.

It should be noted that embodiments of this application may be applicable to both multicast and broadcast. For ease of description, the following uses the multicast as an example for description.

The following describes technical solutions provided in this application.

In embodiments of this application, "represent" may include direct representation and indirect representation, or may include explicit representation and implicit representation. Information represented by one piece of information (for example, first information described below) is referred to as to-be-represented information. In a specific implementation process, the to-be-represented information is represented in a plurality of manners. For example, but no limitation, the to-be-represented information may be directly represented, for example, by the to-be-represented information or an index/identifier of the to-be-represented information. Alternatively, the to-be-represented information may be indirectly represented by indicating another information, and there is an association relationship between the another information and the to-be-represented information. Alternatively, only one part of the to-be-represented information may be indicated, and the other part of the to-be-represented information is known or agreed on in advance. For example, specific information may alternatively be indicated by using an arrangement sequence of information that is agreed on in advance (for example, stipulated in a protocol), to reduce indication overheads to some extent.

It may be understood that the term "and/or" in this specification describes only an association relationship between associated objects, and represents that three relationships may exist. For example, A and/or B may represent the following three cases: Only A exists, both A and B exist, and only B exists. In addition, the character "/" in this specification generally indicates an "or" relationship between the associated objects.

In embodiments of this application, descriptions such as "when . . . ", "in a case of . . . ", and "if" all mean that a device (for example, a multicast session management network element or a first access and mobility management function network element) performs corresponding processing in an objective situation, and are not intended to limit time, and the device (for example, the multicast session management network element or the first access and mobility management function network element) is not required to perform a determining action during implementation; and do not mean any other limitation.

In embodiments of this application, "first", "second", and various numerical numbers are merely used for distinguishing for ease of description, and are not intended to limit the scope of embodiments of this application, for example, distinguishing between different service areas.

In embodiments of this application, an application server includes two functional modules: an AS and an application function (AF).

The AS may be understood as a data plane entity, and the AS sends multicast/broadcast data corresponding to a target service (for example, a first multicast service described below) to an operator network (a PLMN network).

Alternatively, the AF may be understood as a control plane entity, and may include the following functions:

(1) sending a configuration parameter corresponding to the target service to the operator network,
  for example, sending a service requirement parameter corresponding to the target service to the operator network, for example, priority information, bandwidth information, delay information, or a standardized QoS identifier;
(2) sending a control parameter corresponding to the target service to the operator network,
  for example, sending an activation/deactivation request corresponding to the target service to the operator network; and
(3) obtaining, from the operator network, a parameter corresponding to the target service, such as a TMGI, a SAI, and a frequency.

In general, the application server is configured to: configure or obtain a parameter of the target service in the operator network, send control information of the target service to the operator network, and send data of the target service to the operator network.

The foregoing briefly describes terms involved in this application, and details are not described in the following embodiments again. The following describes in detail a communication method provided in embodiments of this application with reference to the accompanying drawings. Embodiments provided in this application may be applied to the architecture shown in FIG. 1. This is not limited.

Figure 2:
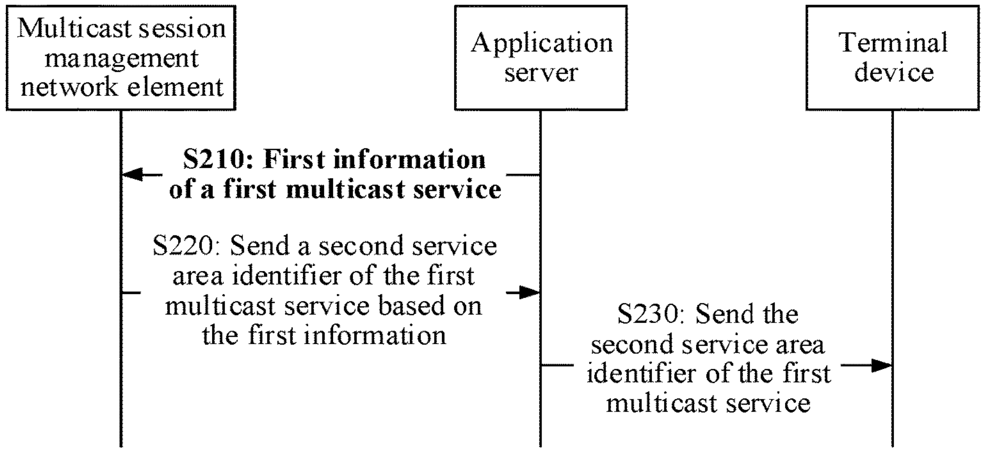
FIG. 2 is a schematic flowchart of a communication method according to an embodiment of this application.
Figure 3:
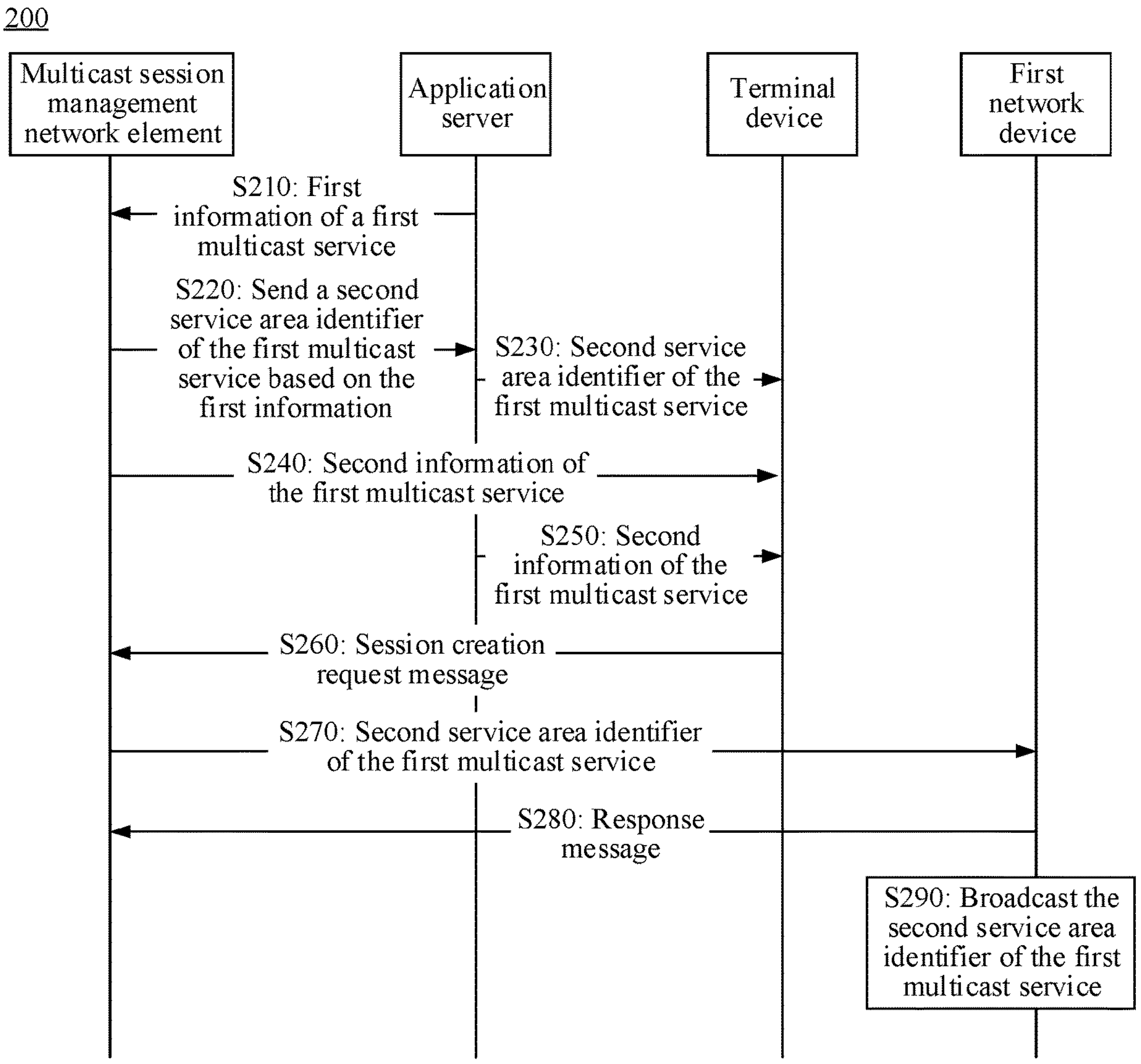
FIG. 3 is a schematic flowchart of another communication method according to an embodiment of this application.

FIG. 2 and FIG. 3 are schematic flowcharts of a communication method 200 according to an embodiment of this application.

As shown in FIG. 2, the communication method 200 includes S210 to S230. The following describes in detail steps included in the communication method 200.

S210: An application server sends first information of a first multicast service to a multicast session management network element.

Correspondingly, the multicast session management network element receives the first information of the first multicast service from the application server.

For example, the first multicast service may be a map update service, a public safety service, an emergency communication service, a video transmission service (for example, an emergency video communication (mission critical video) service or an emergency voice communication (mission critical push-to-talk) service), an IoT software upgrade service, or the like.

The first information is used for requesting a second service area identifier of the first multicast service.

It should be noted that the first information may be a message, or may be an information element in the message. This is not limited. In addition, a quantity of second service area identifiers that may be requested by using the first information is not limited. In other words, there may be one or more second service area identifiers.

For ease of description, the following uses an example in which the first information requests one second service area identifier of the first multicast service for description.

In an example, the second service area identifier of the first multicast service identifies an area including one or more cells. For example, a SAI 1 identifies an area including a cell a and a cell b, and in this case, the SAI 1={cell a, cell b}; SAI 2 identifies an area including the cell a, and in this case, the SAI 2={cell a}; SAI 3 identifies an area including the cell a, the cell b, and a cell c, and in this case, the SAI 3={cell a, cell b, cell c}.

In addition, the second service area identifier may identify a second service area, and may further indicate a location of UE to a CN.

In another example, the second service area identifier of the first multicast service may include one or more service area identifiers, and each service area identifier may be any number from 0 to 65535. When the service area identifier is 0, it may indicate a set of cells on an entire network. A service area identifier is configured by an operator and corresponds to one or more cells. For example, the second service area identifier of the first multicast service may be {0}, {123}, {65534}, {65531, 65532}, or the like.

In another example, the second service area identifier of the first multicast service may be similar to a structure and a usage manner of an existing multimedia broadcast/multicast service service area identifier (multimedia broadcast/multicast service SAI, MBMS SAI).

For example, the first information indicates at least one of the following: a first service area (service area, SA) of the first multicast service, a type of the first multicast service, or the first multicast service.

A manner in which the first information indicates the first service area of the first multicast service is not limited in embodiments of this application. For example, the first information includes the first service area of the first multicast service or an index/identifier of the first service area. The index/identifier of the first service area identifies the first service area.

In an example, the first service area of the first multicast service may include one or more MBMS SAIs. In any case, each MBMS SA cannot include more than 256 MBMS SAIs. The MBMS SAI is to identify a group of cells within a PLMN, and the cell is independent of an associated location/routing/service area and a physical location of the cell. One cell is to belong to one or more MBMS SAs, and therefore is addressable by the one or more MBMS SAs. The MBMS SA is configuration information within the PLMN, and may be obtained by the application server through configuration, or may be obtained in another manner, for example, through reporting by the UE.

In another example, the first service area of the first multicast service may consist of one or more cell identifiers (cell ids), or may consist of one or more tracking areas (TAs). The cell identifier and the tracking area may be obtained by the application server through configuration, or may be obtained in another manner, for example, through reporting by the UE.

In another example, the first service area of the first multicast service may consist of information about a geographical area, for example, a range of longitude and latitude coordinates and a street name. Then, another network element (for example, an NEF network element) within the PLMN network converts the information about the geographic area into a corresponding identifier of the PLMN network, for example, a cell list, where the cell list may include one or more cell identifiers; or a tracking area list (TAI), where the tracking area list includes one or more tracking area identifiers; or a base station identifier list (RAN id list), where the base station identifier list may include one or more base station identifiers.

A manner in which the first information indicates the type of the first multicast service is not limited in embodiments of this application. For example, the first information includes the type of the first multicast service or the index/identifier of the type of the first multicast service, and the index/identifier of the type of the first multicast service identifies the type of the first multicast service.

The type of the first multicast service identifies a service type of the first multicast service. The service type may identify a service of a specific type. For example, the type of the first multicast service includes a public safety service type, a V2X service type, a video service type, a broadcast television service type, an IoT service type, a general service type, or the like. Specifically, the public safety service type may identify a service whose service type is public safety.

For example, if the first multicast service is the map update service, the type of the first multicast service may be the public safety service type or the general service type.

For another example, if the first multicast service is the video transmission service, the type of the first multicast service may be the video service type.

For another example, if the first multicast service is the IoT software upgrade service, the type of the first multicast service may be the IoT service type.

A manner in which the first information indicates the first multicast service is not limited in embodiments of this application. For example, the first information includes the first multicast service or an identifier of the first multicast service, and the identifier of the first multicast service identifies the first multicast service.

For example, the identifier of the first multicast service may be a name of the first multicast service.

In some embodiments, the identifier of the first multicast service may alternatively be implemented by another identifier.

In an example, the another identifier includes an application identifier.

Further, the first multicast service may be determined based on the application identifier.

For example, the identifier of the first multicast service may be com.example.applicationid1. The multicast session management network element learns, based on all or a part of fields in the com.example.applicationid1, that the first multicast service is a service of a broadcast television type.

For another example, the identifier of the first multicast service may be com.facebook.xyz. The multicast session management network element determines, based on all or a part of fields in the com.facebook.xyz, for example, an identifier of facebook, that the first multicast service is a service of a video type.

For still another example, the identifier of the first multicast service may be com.whatsapp. The multicast session management network element determines, based on all or a part of fields in the com.whatsapp, for example, an identifier of whatsapp, that the first multicast service is a service of a general type.

In another example, the another identifier includes an identifier of a feature of the first multicast service, for example, an IP multicast address and/or a port number.

Further, the first multicast service may be determined based on a correspondence between the identifier of the feature of the first multicast service and the first multicast service.

S220: The multicast session management network element sends the second service area identifier of the first multicast service to the application server based on the first information.

Correspondingly, the application server receives the second service area identifier that is of the first multicast service and that is sent by the multicast session management network element.

It should be noted that a quantity of second service area identifiers sent by the multicast session management network element to the application server is not limited in embodiments of this application. In other words, the multicast session management network element may send one or more second service area identifiers to the application server.

For ease of description, the following uses an example in which the multicast session management network element sends one second service area identifier to the application server for description.

In some embodiments, S220 includes: The multicast session management network element determines the second service area identifier that is of the first multicast service and that corresponds to the first information. The multicast session management network element sends the second service area identifier of the first multicast service to the application server.

It should be noted that a quantity of second service area identifiers that are of the first multicast service and that are determined by the multicast session management network element is not limited in embodiments of this application. In other words, the multicast session management network element may determine one or more second service area identifiers of the first multicast service.

For ease of description, the following uses an example in which the multicast session management network element determines one second service area identifier for description.

When the first information indicates the first service area of the first multicast service, a manner A and a manner B described below are used as examples to describe how the multicast session management network element determines the second service area identifier that is of the first multicast service and that corresponds to the first information.

Manner A: The multicast session management network element may first obtain, based on the first information, a first cell list, a first tracking area list, or a first base station list that corresponds to the first multicast service; and then the multicast session management network element obtains the second service area identifier of the first multicast service based on the first cell list, the first tracking area list, or the first base station list.

For example, the multicast session management network element may obtain, based on a correspondence between a cell list/a tracking area list/a base station list and a service area identifier, a service area identifier corresponding to the first cell list, the first tracking area list, or the first base station list, and use the service area identifier as the second service area identifier. In this example, the first service area of the first multicast service may be identified by the cell list, the tracking area list, or the base station list.

A storage location of the correspondence between a cell list/a tracking area list/a base station list and a service area identifier is not limited in embodiments of this application.

In an example, the correspondence between a cell list/a tracking area list/a base station list and a service area identifier may be stored in the multicast session management network element.

For example, the multicast session management network element stores a correspondence of {SAI, cell id/TA id/RAN id}. The multicast session management network element finds, based on the cell id/TA id/RAN id, a SAI corresponding to the first cell list, the first tracking area list, or the first base station list, and uses the SAI as the second service area identifier of the first multicast service.

In another example, the correspondence between a cell list/a tracking area list/a base station list and a service area identifier may be stored in another network element, for example, an NEF, a UDM, or an NRF. In this case, the multicast session management network element sends a query request message to a network element (for example, the UDM, the NEF, or the NRF) configured to store the correspondence between a cell list/a tracking area list/a base station list and a service area identifier. The query request message includes the first cell list, the first tracking area list, or the first base station list. Then, the network element configured to store the correspondence between a cell list/a tracking area list/a base station list and a service area identifier returns, to the multicast session management network element, the service area identifier corresponding to the first cell list, the first tracking area list, or the first base station list, and the multicast session management network element uses the service area identifier as the second service area identifier of the first multicast service.

Manner B: The multicast session management network element or another network element (for example, the NEF or the UDM) in a network performs authentication on a service area of the first multicast service, for example, whether the application server is authorized to transmit data of the multicast/broadcast service in the service area of the first multicast service. If the authentication succeeds, the multicast session management network element uses the service area of the first multicast service as a service area corresponding to the second service area identifier of the first multicast service. Alternatively, if the authentication partially succeeds (for example, the application server is authorized to transmit the data of the multicast/broadcast service in only a part of areas), the multicast session management network element uses the authorized part of the service area of the first multicast service as a service area corresponding to the second service area identifier of the first multicast service.

When the first information includes the type of the first multicast service, a manner C described below is used as an example to describe how the multicast session management network element determines the second service area identifier that is of the first multicast service and that corresponds to the first information.

Manner C: The multicast session management network element may obtain, based on a locally configured correspondence between a type of a multicast service and a service area identifier, a service area identifier corresponding to the type of the first multicast service, and use the service area identifier as the second service area identifier of the first multicast service.

In an example, the PLMN network uses different service areas for different services, and the PLMN network configures a correspondence between a service type and a service area on a multicast session management network element side. For example, a correspondence such as {service type 1, SA a} and {service type 2, SA b} is configured on the multicast session management network element. The multicast session management network element finds, based on the type of the first multicast service (for example, the service type 1) and the foregoing correspondence (for example, the {service type 1, SA a}), a service area (for example, the SA a) corresponding to the type of the first multicast service, and the service area is the second service area identifier of the first multicast service.

In another example, the PLMN network stores a correspondence (for example, the {service type 1, SA a} and the {service type 2, SA b}) between a service type and a service area in a specific network element (for example, the NEF, the UDM, or the NRF). The multicast session management network element sends the type (for example, the service type 1) of the first multicast service to the network element that stores the correspondence between a service type and a service area. The network element that stores the correspondence between a service type and a service area finds, based on the type of the first multicast service and the correspondence (for example, the {service type 1, SA a}), a service area (for example, the SA a) corresponding to the type of the first multicast service, where the service area is the second service area identifier of the first multicast service, and returns the service area identifier to the multicast session management network element.

When the first information includes the identifier of the first multicast service, the multicast session management network element may first obtain the first multicast service based on the identifier of the first multicast service, and then the multicast session management network element determines the second service area identifier of the first multicast service based on the type of the first multicast service.

For an example in which the multicast session management network element determines the second service area identifier of the first multicast service based on the type of the first multicast service, refer to the description of the manner C. Details are not described herein again.

It should be noted that when the first information indicates at least two of the first service area of the first multicast service, the type of the first multicast service, or the identifier of the first multicast service, the multicast session management network element may determine the second service area identifier based on at least one of the solution of determining the second service area identifier based on the service area that is of the first multicast service and that is indicated by the first information, the solution of determining the second service area identifier based on the type that is of the first multicast service and that is included in the first information, or the solution of determining the second service area identifier based on the identifier that is of the first multicast service and that is included in the first information.

S230: The application server notifies a terminal device of the second service area identifier of the first multicast service. In other words, the application server sends the second service area identifier of the first multicast service to the terminal device.

Correspondingly, the terminal device receives the second service area identifier of the first multicast service from the application server.

According to the communication method 200 provided in the foregoing embodiment, the application server sends the first information to the multicast session management network element, to request the second service area identifier of the first multicast service. Further, the multicast session management network element sends the second service area identifier of the first multicast service to the application server based on the first information. In this way, the application server may obtain the second service area identifier of the first multicast service when the application server does not learn of network topology information.

In some embodiments, S210 to S230 may be implemented in a procedure in which the application server requests allocation of a temporary multicast group identifier.

For example, S210 to S230 are implemented via existing messages in the procedure in which the application server requests the allocation of the temporary multicast group identifier. For example, the first information in S210 may be carried in an existing temporary multicast group identifier allocation request (nnef_tmgi_allocate request) message. In S220, the second service area identifier of the first multicast service may be carried in a response message of the existing temporary multicast group identifier allocation request message. The second service area identifier of the first multicast service in S230 may be carried in an existing service announcement (service announcement) message, a service announcement message, or a service notification message.

For example, implementation of S210 and S220 are independent of an existing message in the procedure in which the application server requests the allocation of the temporary multicast group identifier. S230 is implemented via the existing message in the procedure in which the application server requests the allocation of the temporary multicast group identifier. For example, S210 and S220 are performed after an existing application server receives a response message of a temporary multicast group identifier allocation request message and before the existing application server sends the service announcement message. The second service area identifier of the first multicast service in S230 may be carried in the existing service announcement message.

Optionally, in some embodiments, as shown in FIG. 3, the communication method 200 further includes S240.

S240: The multicast session management network element sends second information of the first multicast service to the application server.

Correspondingly, the application server receives the second information of the first multicast service from the multicast session management network element.

It should be noted that the second information may be a message, or may be an information element in the message. This is not limited.

The second information includes at least one of the following: a frequency of the first multicast service or a temporary multicast group identifier of the first multicast service.

It should be noted that, in this embodiment, S240 needs to be performed only after S210. A sequence between S240 and S220 or between S240 and S230 is not limited in this embodiment of this application.

It should be noted that a quantity of frequencies of the first multicast service and/or a quantity of temporary mobile group identities of the first multicast service that are sent by the multicast session management network element to the application server are/is not limited in embodiments of this application. In other words, the multicast session management network element may send one or more frequencies of the first multicast service and/or one or more temporary mobile group identities of the first multicast service to the application server.

For ease of description, the following uses an example in which the multicast session management network element sends one frequency of the first multicast service and/or one temporary multicast group identifier of the first multicast service to the application server for description.

In some embodiments, S240 includes: The multicast session management network element determines, based on the first information, the second information that is of the first multicast service and that corresponds to the first information. The multicast session management network element sends the second information of the first multicast service to the application server.

It should be noted that the quantity of frequencies of the first multicast service and/or the quantity of temporary mobile group identities of the first multicast service that are determined by the multicast session management network element are/is not limited in embodiments of this application. In other words, the multicast session management network element may determine one or more frequencies of the first multicast service and/or one or more temporary mobile group identities of the first multicast service.

For ease of description, the following uses an example in which the multicast session management network element determines one frequency of the first multicast service and/or one temporary multicast group identifier of the first multicast service for description.

For example, the multicast session management network element determines, based on a correspondence between a frequency/temporary multicast group identifier of a multicast service and a service area/a type of the multicast service/a multicast service, a frequency/temporary multicast group identifier that is of a multicast service and that corresponds to the first service area of the first multicast service/the type of the first multicast service/the first multicast service, and uses the frequency/the temporary multicast group identifier as the frequency/the temporary multicast group identifier of the first multicast service.

A storage location of the correspondence between a frequency/temporary multicast group identifier of a multicast service and a service area/a type of the multicast service/a multicast service is not limited in embodiments of this application. For example, the correspondence between a frequency/temporary multicast group identifier of a multicast service and a service area/a type of the multicast service/a multicast service may be stored in the multicast session management network element, or may be stored in another network element, for example, the NEF, the UDM, or the NRF. When a correspondence between a frequency of a multicast service and a service area is stored in the another network element, the multicast session management network element may obtain the frequency/the temporary multicast group identifier of the first multicast service by interacting with the another network element.

In some embodiments, a correspondence between a frequency/temporary multicast group identifier of the multicast service and a service area may be alternatively replaced with a correspondence between a frequency/temporary multicast group identifier of the multicast service and a cell identifier, a tracking area identifier, or a base station identifier. In this case, the multicast session management network element may first determine, based on a first service area, a first cell identifier, a first tracking area identifier, or a first base station identifier that is of the first multicast service and that corresponds to the first service area. Then, the multicast session management network element determines, based on the correspondence between a frequency/temporary multicast group identifier of the multicast service and a cell identifier, a tracking area identifier, or a base station identifier, a frequency/temporary multicast group identifier that is of the multicast service and that corresponds to the first service area, the first tracking area identifier, or the first base station identifier corresponding to the first service area, and uses the frequency/temporary multicast group identifier as the frequency/temporary multicast group identifier of the first multicast service.

For example, the multicast session management network element may further determine, based on the first information, that the first information does not include the temporary multicast group identifier of the first multicast service, and the multicast session management network element determines that the temporary multicast group identifier of the first multicast service needs to be allocated. For example, the multicast session management network element selects an available temporary multicast group identifier from a temporary multicast group identifier resource pool preconfigured by a network, and uses the available temporary multicast group identifier as the temporary multicast group identifier of the first multicast service.

A storage location of the temporary multicast group identifier resource pool preconfigured by the network is not limited in embodiments of this application. For example, the temporary multicast group identifier resource pool preconfigured by the network may be stored in the multicast session management network element, or may be stored in another network element, for example, the NEF, the UDM, or the NRF. When the temporary multicast group identifier resource pool is stored in the another network element, the multicast session management network element may obtain the temporary multicast group identifier of the first multicast service by interacting with the another network element.

It should be noted that in some embodiments, the multicast session management network element may perform the foregoing solution of determining, based on the first information, the frequency that is of the first multicast service and that corresponds to the first information and the foregoing solution of determining, based on the first information, the temporary multicast group identifier that is of the first multicast service and that corresponds to the first information.

In some other embodiments, S240 includes: The multicast session management network element determines, based on the second service area identifier of the first multicast service, the second information that is of the first multicast service and that corresponds to the second service area identifier of the first multicast service. The multicast session management network element sends the second information of the first multicast service to the application server.

For example, the multicast session management network element may determine, based on the correspondence between a frequency/a temporary multicast group identifier of the multicast service and a service area, the second information that is of the first multicast service and that corresponds to the second service area identifier of the first multicast service. For a specific process, refer to the foregoing description. Details are not described herein again.

A storage location of the correspondence between a frequency/temporary multicast group identifier of the multicast service and a service area is not limited in embodiments of this application. For example, the correspondence between a frequency/temporary multicast group identifier of the multicast service and a service area may be stored in the multicast session management network element; or may be stored in another network element, for example, the UDM, a user data repository (UDR), a PCF, the NRF, the NEF, an MBSF-NEF, or a network element dedicated to multicast and broadcast. The correspondence between a frequency/temporary multicast group identifier of the multicast service and a service area may be independently deployed, or may be implemented by enhancing a function of an existing network element. When a correspondence between a network device and a service area corresponding to the network device is stored in the another network element, the multicast session management network element may obtain, by interacting with the another network element, the second information that is of the first multicast service and that corresponds to the second service area identifier of the first multicast service.

Optionally, in some embodiments, as shown in FIG. 3, the communication method 200 further includes S250.

S250: The application server notifies the terminal device of the second information of the first multicast service. In other words, the application server sends the second information of the first multicast service to the terminal device.

Correspondingly, the terminal device receives the second information of the first multicast service from the application server.

In some embodiments, S240 and S250 may alternatively be implemented in a procedure in which the application server requests allocation of the temporary multicast group identifier.

For example, S240 is implemented via the existing message in the procedure in which the application server requests the allocation of the temporary multicast group identifier. For example, the second information in S240 may be carried in the response message of the existing temporary multicast group identifier allocation request message. The second information of the first multicast service in S250 may be carried in the existing service announcement message.

For example, implementation of S240 is independent of the existing message in the procedure in which the application server requests the allocation of the temporary multicast group identifier. S250 is implemented via the existing message in the procedure in which the application server requests the allocation of the temporary multicast group identifier. For example, S240 is performed after the existing application server receives the response message of the temporary multicast group identifier allocation request message and before the existing application server sends the service announcement message. The second information of the first multicast service in S250 may be carried in the existing service announcement message.

Optionally, in some embodiments, as shown in FIG. 3, the communication method 200 further includes S260 and S270.

S260: The application server sends a session creation request message to the multicast session management network element.

Correspondingly, the multicast session management network element receives the session creation request message from the application server.

In some embodiments, the session creation request message may be understood as a creation request message of the foregoing multicast session.

It should be noted that the session creation request message may be executed in a procedure in which the application server requests the identifier of the first service area of the first multicast service, or this may be understood as that the session creation request message is executed in a procedure in which the multicast session management network element allocates/configures the identifier of the first service area.

Optionally, the session creation request message may or may not carry the first service area identifier of the first multicast service, the second service area identifier of the first multicast service, and/or the second information of the first multicast service.

S270: The multicast session management network element notifies a first network device of the second service area identifier of the first multicast service based on the session creation request message.

Optionally, the multicast session management network element may further notify the first network device of the frequency of the first multicast service, the first service area of the first multicast service, and/or the temporary multicast group identifier of the first multicast service.

Optionally, in some embodiments, S270 includes: The multicast session management network element determines the first network device. The multicast session management network element notifies the first network device of the second service area identifier of the first multicast service.

In an example, the multicast session management network element may determine the first network device based on a local configuration or the first service area of the first multicast service.

For example, the multicast session management network element may determine, based on the correspondence between a network device and a service area (for example, a cell id/list, a TA id/list, or a RAN id/list) corresponding to the network device, a network device corresponding to the first service area of the first multicast service, and use the network device, corresponding to the first service area of the first multicast service, as the first network device.

A storage location of the correspondence between a network device and a service area corresponding to the network device is not limited in embodiments of this application. For example, the correspondence between a network device and a service area corresponding to the network device may be stored in the multicast session management network element, or may be stored in another network element, for example, the NEF, the UDM, or the NRF. When the correspondence between a network device and a service area corresponding to the network device is stored in the another network element, the multicast session management network element may obtain the first network device by interacting with the another network element.

In another example, the multicast session management network element may forward, to a first access and mobility management function, content carried in the session creation request message. Further, the first access and mobility management function determines the first network device based on a local configuration or the first service area of the first multicast service. The first access and mobility management function notifies the first network device of the second service area identifier of the first multicast service.

For example, the multicast session management network element may determine, based on a correspondence between an access and mobility management function and a service area (for example, a cell id/list, a TA id/list, or a RAN id/list) corresponding to the access and mobility management function, an access and mobility management function corresponding to the first service area of the first multicast service, and use the access and mobility management function, corresponding to the first service area of the first multicast service, as the first access and mobility management function.

A storage location of the correspondence between an access and mobility management function and a service area corresponding to the access and mobility management function is not limited in embodiments of this application. For example, the correspondence between an access and mobility management function and a service area corresponding to the access and mobility management function may be stored in the multicast session management network element, or may be stored in another network element, for example, the NEF, the UDM, or the NRF. When the correspondence between an access and mobility management function and a service area corresponding to the access and mobility management function is stored in another network element, the multicast session management network element may obtain the first access and mobility management function by interacting with the another network element.

Further, in an example, the first access and mobility management function may determine, based on a correspondence between a network device and a service area (for example, a cell id/list, a TA id/list, or a RAN id/list) corresponding to the network device, a network device corresponding to the first service area of the first multicast service, and use the network device, corresponding to the first service area of the first multicast service, as the first network device.

A storage location of the correspondence between a network device and a service area corresponding to the network device is not limited in embodiments of this application. For example, the correspondence between a network device and a service area corresponding to the network device may be stored in the first access and mobility management function network element, or may be stored in another network element, for example, the NEF, the UDM, or the NRF. When the correspondence between a network device and a service area corresponding to the network device is stored in the another network element, the first access and mobility management function network element may obtain the first network device by interacting with the another network element.

In another example, the first access and mobility management function may send the first service area identifier of the first multicast service and/or the second service area identifier of the first multicast service to all network devices that establish a next generation application protocol NGAP (next generation application protocol) connection. After receiving the first service area identifier of the first multicast service and the second service area identifier of the first multicast service, the network device determines whether the network device is located in the first service area of the first multicast service and/or the second service area of the first multicast service. When a cell corresponding to the network device or a tracking area corresponding to the network device has an intersection with the first service area of the first multicast service and/or the second service area of the first multicast service, or when a cell corresponding to the network device or a tracking area corresponding to the network device includes the first service area of the first multicast service and/or the second service area of the first multicast service, this may be considered as that the network device is located in the first service area of the first multicast service and/or the second service area of the first multicast service. Then, the network device may feed back a determining result to the first access and mobility management function. When the determining result indicates that the network device is located in the first service area of the first multicast service and/or the second service area of the first multicast service, the network device may be used as the first network device.

A specific form of the determining result is not limited in embodiments of this application. For example, the determining result may indicate that this is successful or unsuccessful. When the determining result indicates that this is successful, the network device is located in the first service area of the first multicast service and/or the second service area of the first multicast service. When the determining result indicates that this is not successful, the network device is not located in the first service area of the first multicast service and/or the second service area of the first multicast service.

Optionally, the network device may alternatively feed back success information to the first access and mobility management function only when the network device is located in the first service area of the first multicast service and/or the second service area of the first multicast service. In this case, a network device corresponding to the success information received by the first access and mobility management function may be used as the first network device.

In S270, when the multicast session management network element allocates the second service area identifier of the first multicast service, the multicast session management network element further notifies a corresponding network device of the second service area identifier of the first multicast service. In this way, the corresponding network device, namely, the first network device, may be dynamically controlled to broadcast the second service area identifier of the first multicast service.

Optionally, in some embodiments, as shown in FIG. 3, the communication method 200 further includes S280.

S280: The first network device sends a response message to the multicast session management network element. The response message indicates that the first network device has received the second service area identifier of the first multicast service.

Correspondingly, the multicast session management network element receives the response message from the first network device.

Optionally, in some embodiments, as shown in FIG. 3, the communication method 200 further includes S290.

S290: The first network device broadcasts the second service area identifier of the first multicast service.

Optionally, the first network device may further broadcast the frequency of the first multicast service, the first service area of the first multicast service, and/or the temporary multicast group identifier of the first multicast service.

Optionally, the first network device may include the second service area identifier of the first multicast service, the frequency of the first multicast service, the first service area of the first multicast service, and/or the temporary multicast group identifier of the first multicast service in a system broadcast message.

In some embodiments, the application server may perform information transmission with the multicast session management network element via a network display function or a multicast/broadcast service function.

For example, the application server first sends the first information to the network display function or the multicast/broadcast service function, and then the network display function or the multicast/broadcast service function sends the first information to the multicast session management network element.

For another example, the multicast session management network element first sends the second information or the second service area identifier of the first multicast service to the network display function or the multicast/broadcast service function, and then the network display function or the multicast/broadcast service function sends the second information or the second service area identifier of the first multicast service to the application server.

In an embodiment in which the application server performs the information transmission with the multicast session management network element via the network display function or the multicast/broadcast service function, after S210, to be specific, after receiving the first information described above, the network display function or the multicast/broadcast service function may perform authentication on a request of the application server. The authentication may be mainly implemented by querying subscription information of the application server.

For example, the network display function or the multicast/broadcast service function may perform authentication on whether the application server can send the first information; or may perform authentication on a parameter (for example, content represented by the first information) sent by the application server; or may perform authentication on whether the application server can request the second service area identifier of the first multicast service.

If the authentication of the application server succeeds, the network display function or the multicast/broadcast service function may obtain identification information of the multicast session management network element by querying an NRF network repository function. For example, the application server may further indicate information such as a data network name and a slice in the first information in S210, and the network display function or the multicast/broadcast service function uses the information as an input of an NRF query, to obtain the identification information of the multicast session management network element, and then send the first information to the multicast/broadcast service function. For another example, the network display function or the multicast/broadcast service function may obtain the identification information of the multicast session management network element in a manner of local configuration, and then send the first information to the multicast/broadcast service function.

In some other embodiments, if the application server has a capability of providing information for a core network or invoking a service opened by a core network element, the application server may directly communicate with the multicast session management network element.

It may be understood that some optional features in embodiments of this application may not depend on another feature in some scenarios, or may be combined with another feature in some scenarios. This is not limited.

It may be further understood that solutions in embodiments of this application may be properly combined for usage, and explanations or descriptions of terms in embodiments may be mutually referred to or explained in embodiments. This is not limited.

It may be further understood that various numeric sequence numbers in embodiments of this application do not mean execution sequences, but are merely for differentiation for ease of description, and should not constitute any limitation on an implementation process of embodiments of this application.

It may be further understood that some message names, such as the temporary multicast group identifier allocation request message, are involved in embodiments of this application. It should be understood that the message names do not limit the protection scope of embodiments of this application.

It may be further understood that in the foregoing communication method embodiments, a communication method and an operation that are implemented by the multicast session management network element may be implemented by a component (for example, a chip or a circuit) of the multicast session management network element. A communication method and an operation that are implemented by the application server may be implemented by a component (for example, a chip or a circuit) of the application server. In addition, a communication method and an operation that are implemented by the first network device may be implemented by a component (for example, a chip or a circuit) of the first network device. This is not limited.

Corresponding to the communication methods provided in the foregoing communication method embodiments, embodiments of this application further provides corresponding apparatuses, and the apparatus includes a corresponding module configured to perform the foregoing communication method embodiment. The module may be software, hardware, or a combination of software and hardware. It may be understood that the technical features described in the foregoing communication method embodiments are also applicable to the following apparatus embodiments.

Figure 4:
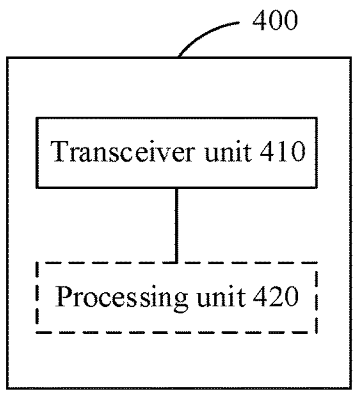
FIG. 4 is a schematic block diagram of a communication apparatus according to an embodiment of this application.

FIG. 4 is a schematic block diagram of an apparatus according to an embodiment of this application. The apparatus 400 includes a transceiver unit 410, and the transceiver unit 410 may be configured to implement a corresponding communication function. The transceiver unit 410 may also be referred to as a communication interface or a communication unit.

Optionally, the apparatus 400 may further include a processing unit 420, and the processing unit 420 may be configured to perform data processing.

Optionally, the apparatus 400 further includes a storage unit. The storage unit may be configured to store instructions and/or data. The processing unit 420 may read the instructions and/or the data in the storage unit, to enable the apparatus to implement actions of different devices in the foregoing communication method embodiments, for example, an action of a multicast session management network element, an action of an application server, and an action of a first network device.

The apparatus 400 may be configured to perform the action performed by the multicast session management network element in the foregoing communication method embodiment. In this case, the apparatus 400 may be the multicast session management network element or a component of the multicast session management network element. The transceiver unit 410 is configured to perform a related operation of receiving and sending on a multicast session management network element side in the foregoing communication method embodiment. The processing unit 420 is configured to perform a related operation of processing on the multicast session management network element side in the foregoing communication method embodiment.

In a design, the apparatus 400 is configured to perform the action performed by the multicast session management network element in the foregoing communication method embodiment.

In a possible implementation, the transceiver unit 410 is configured to receive first information of a first multicast service from the application server, where the first information indicates at least one of the following: a first service area of the first multicast service, a type of the first multicast service, or the first multicast service. The processing unit 420 is configured to send a second service area identifier of the first multicast service to the application server based on the first information.

Optionally, the processing unit 420 is further configured to: determine the second service area identifier that is of the first multicast service and that corresponds to the first information; and send the second service area identifier of the first multicast service to the application server.

Optionally, the transceiver unit 410 is further configured to send second information of the first multicast service to the application server, where the second information includes at least one of the following: a frequency of the first multicast service or a temporary multicast group identifier of the first multicast service.

Optionally, the first information is carried in a temporary multicast group identifier allocation request message.

Optionally, the second service area identifier of the first multicast service is carried in a response message of the temporary multicast group identifier allocation request message.

Optionally, the transceiver unit 410 is further configured to receive a session creation request message from the application server. The processing unit 420 is further configured to notify, by the multicast session management network element, the first network device of the second service area identifier of the first multicast service based on the session creation request message.

The apparatus 400 may implement corresponding steps or procedures performed by the multicast session management network element in the communication method embodiment according to embodiments of this application. The apparatus 400 may include units configured to perform the communication method performed by the multicast session management network element in embodiment shown in FIG. 2, or include units configured to perform the communication method performed by the multicast session management network element in embodiment shown in FIG. 3.

It should be understood that a specific process in which the units perform the foregoing corresponding steps is described in detail in the foregoing communication method embodiments. For brevity, details are not described herein again.

In another design, the apparatus 400 is configured to perform the action performed by the application server in the foregoing communication method embodiment.

In a possible implementation, the transceiver unit 410 is configured to send first information of a first multicast service to the multicast session management network element, where the first information includes at least one of the following: a first service area of the first multicast service, a type of the first multicast service, or the first multicast service. The transceiver unit 410 is further configured to receive a second service area identifier of the first multicast service from the multicast session management network element. The transceiver unit 410 is further configured to notify a terminal device of the second service area identifier of the first multicast service.

Optionally, the transceiver unit 410 is further configured to receive second information of the first multicast service from the multicast session management network element, where the second information includes at least one of the following: a frequency of the first multicast service or a TMGI of the first multicast service.

Optionally, the first information is carried in a temporary multicast group identifier TMGI allocation request message.

Optionally, the second service area identifier of the first multicast service is carried in a response message of the TMGI allocation request message.

Optionally, the transceiver unit 410 is further configured to notify the terminal device of the second service area identifier that is of the first multicast service and that is carried in a service announcement message.

The apparatus 400 may implement steps or procedures performed by the application server in the communication method embodiment according to embodiments of this application. The apparatus 400 may include units configured to perform the communication method performed by the application server in embodiment shown in FIG. 2, or include units configured to perform the communication method performed by the application server in embodiment shown in FIG. 3.

It should be understood that a specific process in which the units perform the foregoing corresponding steps is described in detail in the foregoing communication method embodiments. For brevity, details are not described herein again.

In still another design, the apparatus 400 is configured to perform the action performed by the first network device in the foregoing communication method embodiment.

In a possible implementation, the transceiver unit 410 is configured to receive a second service area identifier of a first multicast service; and the transceiver unit 410 is further configured to broadcast the second service area identifier of the first multicast service.

Optionally, the transceiver unit 410 is further configured to: receive second information of the first multicast service and/or a first service area of the first multicast service; and broadcast the second information of the first multicast service and/or the first service area of the first multicast service, where the second information includes at least one of the following: a frequency of the first multicast service or a temporary multicast group identifier of the first multicast service.

The apparatus 400 may implement steps or procedures performed by the application server in the communication method embodiment according to an embodiment of this application. The apparatus 400 may include units configured to perform the communication method performed by the first network device in embodiments shown in FIG. 3.

It should be understood that a specific process in which the units perform the foregoing corresponding steps is described in detail in the foregoing communication method embodiments. For brevity, details are not described herein again.

It should be further understood that the apparatus 400 herein is embodied in a form of a functional unit. The term "unit" herein may refer to an application-specific integrated circuit (ASIC), an electronic circuit, a processor configured to perform one or more software or firmware programs (such as a shared processor, a dedicated processor, or a group processor) and a memory, a combined logic circuit, and/or another appropriate component that supports the described functions. In an optional example, a person skilled in the art may understand that the apparatus 400 may be the multicast session management network element in the foregoing embodiment, and may be configured to perform procedures and/or steps corresponding to the multicast session management network element in the foregoing communication method embodiment; or the apparatus 400 may be the application server in the foregoing embodiment, and may be configured to perform procedures and/or steps corresponding to the application server in the foregoing communication method embodiment; or the apparatus 400 may be the first network device in the foregoing embodiment, and may be configured to perform procedures and/or steps corresponding to the first network device in the foregoing communication method embodiment. To avoid repetition, details are not described herein again.

The apparatus 400 in the foregoing solutions has a function of implementing corresponding steps performed by the multicast session management network element in the foregoing communication method, or the apparatus 700 in the foregoing solutions has a function of implementing corresponding steps performed by the application server in the foregoing communication method, or the apparatus 700 in the foregoing solutions has a function of implementing corresponding steps performed by the first network device in the foregoing communication method. The function may be implemented by hardware, or may be implemented by hardware by executing corresponding software. The hardware or software includes one or more modules corresponding to the foregoing functions. For example, the transceiver unit may be replaced with a transceiver (where for example, a sending unit in the transceiver unit may be replaced with a transmitter, and a receiving unit in the transceiver unit may be replaced with a receiver), and another unit such as the processing unit may be replaced with a processor, to separately perform sending and receiving operations and related processing operations in the communication method embodiments.

In addition, the transceiver unit 410 may be a transceiver circuit (for example, may include a receiver circuit and a transmitter circuit), and the processing unit may be a processing circuit.

It should be noted that the apparatus in FIG. 4 may be the network element or the device in the foregoing embodiments, or may be a chip or a chip system, for example, a system-on-a-chip (SoC). The transceiver unit may be an input/output circuit or a communication interface. The processing unit is a processor, a microprocessor, or an integrated circuit integrated on the chip. This is not limited herein.

Figure 5:
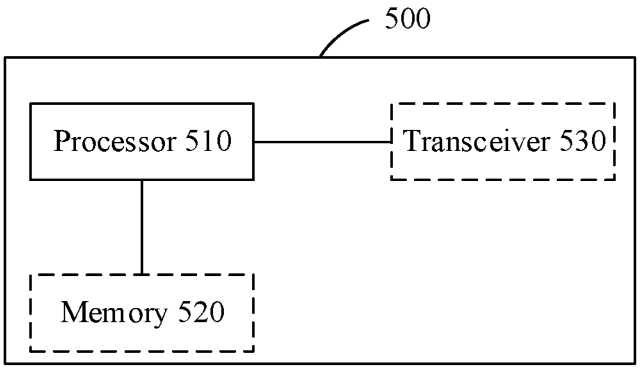
FIG. 5 is a schematic block diagram of another communication apparatus according to an embodiment of this application.

As shown in FIG. 5, an embodiment of this application provides another apparatus 500. The apparatus 500 includes a processor 510. The processor 510 is coupled to a memory 520. The memory 520 is configured to store a computer program or instructions and/or data. The processor 510 is configured to execute the computer program or the instructions stored in the memory 520, or read the data stored in the memory 520, to perform the communication methods in the foregoing communication method embodiments.

Optionally, there are one or more processors 510.

Optionally, there are one or more memories 520.

Optionally, the memory 520 may be integrated with the processor 510, or may be disposed separately.

Optionally, as shown in FIG. 5, the apparatus 500 further includes a transceiver 530. The transceiver 530 is configured to receive and/or send a signal. For example, the processor 510 is configured to control the transceiver 530 to receive and/or send the signal.

In a solution, the apparatus 500 is configured to implement operations performed by the multicast session management network element in the foregoing communication method embodiments.

For example, the processor 510 is configured to execute the computer program or the instructions stored in the memory 520, to implement related operations of the multicast session management network element in the foregoing communication method embodiments, for example, the communication method performed by the multicast session management network element in embodiment shown in FIG. 2, or the communication method performed by the multicast session management network element in embodiment shown in FIG. 3.

For another example, the processor 510 is configured to execute the computer program or the instructions stored in the memory 520, to implement related operations of the application server in the foregoing communication method embodiments, for example, the communication method performed by the application server in embodiment shown in FIG. 2, or the communication method performed by the application server in embodiment shown in FIG. 3.

For still another example, the processor 510 is configured to execute the computer program or the instructions stored in the memory 520, to implement related operations of the first network device in the foregoing communication method embodiments, for example, the communication method performed by the first network device in embodiment shown in FIG. 3.

It should be understood that, the processor mentioned in embodiments of this application may be a central processing unit (CPU), or may be another general-purpose processor, a digital signal processor (DSP), an application-specific integrated circuit (ASIC), a field programmable gate array (FPGA), or another programmable logic device, a discrete gate or transistor logic device, a discrete hardware component, or the like. The general-purpose processor may be a microprocessor, or the processor may be any conventional processor or the like.

It should be further understood that the memory mentioned in embodiments of this application may be a volatile memory and/or a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM). For example, the RAM may be used as an external cache. By way of example but not limitation, the RAM includes a plurality of forms, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or transistor logic device, or a discrete hardware component, the memory (storage module) may be integrated into the processor.

It should further be noted that the memory described in this specification aims to include but is not limited to these memories and any memory of another appropriate type.

Figure 6:
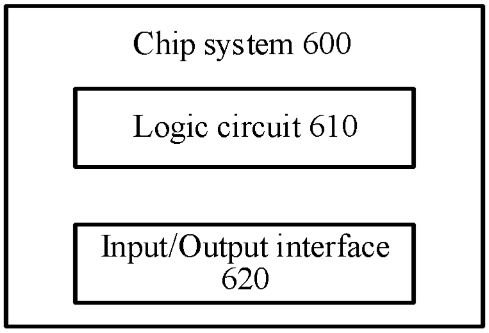
FIG. 6 is a schematic diagram of a communication system according to an embodiment of this application.

As shown in FIG. 6, an embodiment of this application provides a chip system 600. The chip system 600 (or may be referred to as a processing system) includes a logic circuit 610 and an input/output interface (input/output interface) 620.

The logic circuit 610 may be a processing circuit in the chip system 600. The logic circuit 610 may be coupled and connected to a storage unit, and invoke instructions in the storage unit, to enable the chip system 600 to implement the communication methods and functions in embodiments of this application. The input/output interface 620 may be an input/output circuit in the chip system 600, and outputs information processed by the chip system 600, or inputs to-be-processed data or signaling information into the chip system 600 for processing.

Specifically, for example, if the chip system 600 is installed on a multicast session management network element, the logic circuit 610 is coupled to the input/output interface 620, and the logic circuit 610 may receive first information of a first multicast service from an application server through the input/output interface 620; or the input/output interface 620 may input the first information from the application server to the logic circuit 610 for processing. For another example, if the chip system 600 is installed on an application server, the logic circuit 610 is coupled to the input/output interface 620, and the logic circuit 610 may send first information of a first multicast service to a multicast session management network element through the input/output interface 620; or receive a second service area identifier of a first multicast service from a multicast session management network element through the input/output interface 620; or notify a terminal device of a second service area identifier of a first multicast service through the input/output interface 620. For another example, if the chip system 600 is installed on a first network device, the logic circuit 610 is coupled to the input/output interface 620, and the logic circuit 610 may receive a second service area identifier of a first multicast service through the input/output interface 620, or broadcast a second service area identifier of a first multicast service through the input/output interface 620.

In a solution, the chip system 600 is configured to implement an operation performed by the multicast session management network element in the foregoing communication method embodiments.

For example, the logic circuit 610 is configured to implement an operation that is related to processing and that is performed by the multicast session management network element in the foregoing communication method embodiments, for example, an operation that is related to processing and that is performed by the multicast session management network element in embodiment shown in FIG. 2, or an operation that is related to processing and that is performed by the multicast session management network element in embodiment shown in FIG. 3. The input/output interface 620 is configured to implement an operation that is related to sending and/or receiving and that is performed by the multicast session management network element in the foregoing communication method embodiments, for example, an operation that is related to sending and/or receiving and that is performed by the multicast session management network element in embodiment shown in FIG. 2, or an operation that is related to sending and/or receiving and that is performed by the multicast session management network element in embodiment shown in FIG. 3.

For another example, the logic circuit 610 is configured to implement an operation that is related to processing and that is performed by the application server in the foregoing communication method embodiments, for example, an operation that is related to processing and that is performed by the application server in embodiment shown in FIG. 2, or an operation that is related to processing and that is performed by the application server in embodiment shown in FIG. 3. The input/output interface 620 is configured to implement an operation that is related to sending and/or receiving and that is performed by the application server in the foregoing communication method embodiments, for example, an operation that is related to sending and/or receiving and that is performed by the application server in embodiment shown in FIG. 2, or an operation that is related to sending and/or receiving and that is performed by the application server in embodiment shown in FIG. 3.

For another example, the logic circuit 610 is configured to implement an operation that is related to processing and that is performed by the first network device in the foregoing communication method embodiment, for example, an operation that is related to processing and that is performed by the first network device in embodiment shown in FIG. 3. The input/output interface 620 is configured to implement an operation that is related to sending and/or receiving and that is performed by the first network device in the foregoing communication method embodiment, for example, an operation that is related to sending and/or receiving and that is performed by the first network device in embodiment shown in FIG. 3.

An embodiment of this application further provides a computer-readable storage medium. The computer-readable storage medium stores computer instructions used for implementing the communication method performed by the multicast session management network element, the application server, or the first network device in the foregoing communication method embodiment.

For example, when a computer program is executed by a computer, the computer is enabled to implement the communication methods performed by the multicast session management network element in the foregoing communication method embodiments.

An embodiment of this application further provides a computer program product, including instructions. When the instructions are executed by a computer, the communication method performed by the multicast session management network element, the application server, or the first network device in the foregoing communication method embodiment is implemented.

An embodiment of this application further provides a communication system. The communication system includes the multicast session management network element, the application server, and the first network device in the foregoing embodiments. For example, the system includes the multicast session management network element, the application server, and the first network device in the embodiment shown in FIG. 3.

For explanations and beneficial effect of related content of any one of the apparatuses provided above, refer to the corresponding communication method embodiments provided above. Details are not described herein again.

In the several embodiments provided in this application, it should be understood that the disclosed apparatuses and communication methods may be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings, direct couplings, or communication connections may be implemented through some interfaces. Indirect couplings or communication connections between the apparatuses or units may be implemented in an electrical form, a mechanical form, or another form.

All or a part of the foregoing embodiments may be implemented by using software, hardware, firmware, or any combination thereof. When the software is used for implementation, all or a part of the implementation may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. For example, the computer may be a personal computer, a server, or a network device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. For example, the foregoing usable medium may include but is not limited to any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:

receiving, by a multicast session management network element, first information of a first multicast service from an application server, wherein the first information indicates at least one of the following: a first service area of the first multicast service or the first multicast service; and sending, by the multicast session management network element, a service area identifier of the first multicast service to the application server based on the first information, wherein the service area identifier identifies a second service area, wherein the sending, by the multicast session management network element, the service area identifier of the first multicast service to the application server based on the first information comprises:

determining, by the multicast session management network element, the service area identifier corresponding to the first information; and sending, by the multicast session management network element, the service area identifier to the application server.

2. The communication method of claim 1, wherein the first information comprises an identifier of the first multicast service.

3. The communication method of claim 2, wherein the identifier of the first multicast service comprises an application identifier.

4. The communication method of claim 1, wherein the service area identifier comprises a multimedia broadcast/multicast service service area identifier (MBMS SAI).

5. The communication method of claim 1, wherein the first information comprises an identifier of the first service area, with the identifier of the first service area comprising one or more cell identifiers, or one or more tracking areas (TAs).

6. The communication method of claim 1, wherein the service area identifier and the first information have a correspondence relationship.

7. The communication method of claim 1, the method further comprising:

sending, by the multicast session management network element, second information of the first multicast service to the application server, wherein the second information comprises at least one of the following: a frequency of the first multicast service or a temporary multicast group identifier of the first multicast service.

8. The communication method of claim 1, the method further comprising:

receiving, by the multicast session management network element, a session creation request message from the application server; and notifying, by the multicast session management network element, a first network device of the service area identifier based on the session creation request message.

9. The communication method of claim 1, the method further comprising:

sending, by the application server, the first information to the multicast session management network element;

receiving, by the application server, the service area identifier; and notifying, by the application server, a terminal device of the service area identifier.

10. The communication method of claim 9, the method further comprising:

receiving, by the application server, second information of the first multicast service from the multicast session management network element, wherein the second information comprises at least one of the following: a frequency of the first multicast service or a temporary multicast group identifier of the first multicast service.

11. The communication method of claim 9, wherein the notifying, by the application server, the terminal device of the service area identifier comprises:

notifying, by the application server, the terminal device of the service area identifier that is carried in a service announcement message.

12. The communication method of claim 8, the method further comprising:

receiving, by the first network device, the service area identifier; and broadcasting, by the network device, the service area identifier.

13. The communication method of claim 12, the method further comprising:

receiving, by the network device, second information of the first multicast service; and broadcasting, by the network device, the second information, wherein the second information comprises a temporary multicast group identifier of the first multicast service.

14. A communication apparatus, comprising:

a non-transitory memory storage comprising instructions;

at least one processor, configured to execute the instructions, to cause the at least one processor to perform the steps of:

receiving first information of a first multicast service from an application server, wherein the first information indicates at least one of the following: a first service area of the first multicast service or the first multicast service; and sending a service area identifier of the first multicast service to the application server based on the first information, wherein the service area identifier identifies a second service area, wherein the sending the service area identifier of the first multicast service to the application server based on the first information comprises:

determining the service area identifier corresponding to the first information; and sending the service area identifier to the application server.

15. The communication apparatus of claim 14, wherein the at least one processor is further configured to:

receive a session creation request message from the application server; and notify a first network device of the service area identifier based on the session creation request message.

16. The communication apparatus of claim 14, wherein the service area identifier and the first information have a correspondence relationship.

17. A communication system, comprising:

a processor that executes computer instructions stored in a memory operates as a multicast session management network element and as an application server, wherein the application server is configured to send first information of a first multicast service to the multicast session management network element, wherein the first information indicates at least one of the following: a first service area of the first multicast service or the first multicast service;

the multicast session management network element is configured to receive the first information, and send a service area identifier of the first multicast service to the application server based on the first information, wherein the service area identifier identifies a second service area; wherein to send the service area identifier based on the first information, the multicast session management network element is configured to:

determine the service area identifier corresponding to the first information; and send the service area identifier to the application server; and the application server is further configured to receive the service area identifier, and notify a terminal device of the service area identifier.

18. The communication system of claim 17, wherein the application server is further configured to send a session creation request message to the multicast session management network element;

the multicast session management network element is further configured to receive the session creation request message, and notify a first network device of the service area identifier based on the session creation request message.

19. The communication system of claim 18, further comprises:

the first network device, configured to receive the service area identifier, and broadcast the service area identifier.

20. The communication system of claim 17, wherein the application server is further configured to:

notify the terminal device of the service area identifier that is carried in a service announcement message.

* * * * *